United States Patent [19]

Tanaka et al.

[11] 4,418,380
[45] Nov. 29, 1983

[54] METHOD AND APPARATUS FOR CONTROLLING THE CIRCULATING CURRENT OF A CYCLOCONVERTER

[75] Inventors: Shigeru Tanaka, Tama; Susumu Tadakuma, Yamato, both of Japan

[73] Assignee: Tokyo Shibaura Denki Kabushiki Kaisha, Kawasaki, Japan

[21] Appl. No.: 305,226

[22] Filed: Sep. 24, 1981

[51] Int. Cl.³ .................. H02P 13/30; H02M 5/27
[52] U.S. Cl. .................................. 363/10; 323/207; 363/161
[58] Field of Search .............. 323/207; 363/9, 10, 363/160–162

[56] References Cited

U.S. PATENT DOCUMENTS

| 4,009,433 | 2/1977 | Möltgen ........................ 323/207 |
| 4,013,937 | 3/1977 | Pelly et al. ........................ 363/10 |
| 4,303,972 | 12/1981 | Stacey et al. ........................ 363/10 |

FOREIGN PATENT DOCUMENTS

| 51-35022 | 3/1976 | Japan . |
| 53-30761 | 3/1978 | Japan ........................ 323/207 |
| 56-31370 | 3/1981 | Japan ........................ 363/10 |
| 56-31371 | 3/1981 | Japan ........................ 363/10 |
| 56-38980 | 4/1981 | Japan ........................ 363/10 |

Primary Examiner—William H. Beha, Jr.
Attorney, Agent, or Firm—Oblon, Fisher, Spivak, McClelland & Maier

[57] ABSTRACT

A circulating current of a cycloconverter in each phase is distributed and controlled in such a way that a circulating current in a phase having a large absolute value of a load current is small, and the circulating current of a phase having a small absolute value of the load current is large. Therefore, the reactive power is so compensated that the sum of lagged reactive powers of the phases and advanced reactive power of a phase advancing capacitor cancel out each other.

2 Claims, 10 Drawing Figures

METHOD AND APPARATUS FOR CONTROLLING THE CIRCULATING CURRENT OF A CYCLOCONVERTER

BACKGROUND OF THE INVENTION

The present invention relates to a control method for a cycloconverter of the reactive power compensating type in which a power factor of a fundamental wave as seen from a power source side is always 1, and a system for executing the method.

A cycloconverter is a frequency converter for directly converting an AC power at a fixed frequency into another AC power at another different frequency. In the cycloconverter generally constructed by using thyristors, the thyristors when conducted are commutated by a power source voltage. At this time a large amount of reactive power of the power source is consumed. The reactive power constantly varies in synchronism with a frequency of a load connected to the cycloconverter. These causes increase a capacity of an electric power equipment, so that various adverse effects originating from the variation of the reactive power are applied to various types of electric power equipments connected to the cycloconverter. Many proposals for compensating for the reactive power variation have been made.

FIG. 1 shows a cycloconverter using a typical reactive power compensating device of the prior art. A three-phase AC power from the power source 11 is supplied through a three-phase AC bus 12 to a cycloconverter 13 where it is frequency-converted and is supplied to a load 14. Coupled with the three-phase AC line 12 are a phase advancing capacitor 15, a reactive power compensating device 16 and a control circuit 17. The compensating circuit 16 is comprised of a thyristor bridge circuit 16a and a DC reactor 16b. The control circuit 17 detects voltage and current on the three-phase AC bus 12 by means of a transformer 17a and 17b. The detected signals are supplied to a reactive power arithmetic circuit 17c where a reactive power of the power source is calculated. A signal representing a magnitude of the reactive power obtained, together with a signal representing the current $I_O$ detected at the transformer 17e, is supplied to a phase control circuit 17d. The firing angles of the thyristors in the thyristor bridge circuit 16a are controlled by an output signal from the circuit 17d. The current $I_O$ flowing through the DC reactor 16b is controlled so that the reactive power becomes zero.

FIG. 2 is a vector diagram showing a relationship of a voltage in one phase of the three-phase bus 12 and current flowing through the respective portions in the prior art system. An instantaneous current $I_{CC}$ flows into the cycloconverter 13 with respect to the power source voltage $V_S$. An amplitude of the current $I_{CC}$ and a phase angle $\alpha$ of it with the source voltage $V_S$ constantly changes in synchronism with an AC current flowing through the load 14. A constant current $I_C$ leading 90° from the power source voltage $V_S$ flows into a phase advancing capacitor 15. At this time, if a lagged current expressed by $$I_O' = I_C - I_{CC} \cdot \sin \alpha$$

flows from the line 12 into the reactive power compensating device 16, the power source current $I_S$ is in phase with the voltage $V_S$. Even if the magnitude and the phase angle $\alpha$ of the current $I_{CC}$ change, the voltage $V_S$ and the current $I_S$ are always kept in phase by correspondingly controlling the magnitude of the current $I_O' = K I_O$ and the cycloconverter is operated, so that the power factor of the fundamental wave as seen from the power source 11 is always kept at 1.

Since the prior art cycloconverter is provided with the reactive power compensating device having a thyristor bridge circuit comprised of a plurality of thyristor, the overall system of the cycloconverter is expensive.

SUMMARY OF THE INVENTION

Accordingly, an object of the present invention is to provide a control method of a reactive power compensating type cycloconverter which removes variation of the reactive power in the cycloconverter without using an expensive reactive power compensating device, thereby controlling the power factor of the fundamental wave as seen from the power source side to be always 1, and a system for executing the cycloconverter, without increasing a current capacity of the cycloconverter.

To achieve the above object of the present invention, there is provided a control method for a cycloconverter of the reactive power compensating type wherein a phase advancing capacitor is connected with a receiving end of a circulating current type cycloconverter for supplying an AC current at a variable frequency to a polyphase load, and a circulating current of each phase of the cycloconverter is so distributed that a circulating current of a phase in which an absolute value of the load current is large is small, and a circulating current of a phase in which the absolute value of the load current is small is large, whereby the sum of the lagged reactive powers in the phases of the cycloconverter and an advancing reactive power of the phase advancing capacitor cancel out each other.

To achieve the above object, there is further provided a control system for a circulating current type cycloconverter for supplying an AC current to a variable frequency to a polyphase load comprising a phase advancing capacitor connected to a receiving end of the cycloconverter, means for detecting the lagged reactive power of each phase on a power source side of the cycloconverter, means for obtaining a circulating current command value by using detected lagged reactive power value, means for detecting a circulating current of the cycloconverter in each phase, and a control circuit for distributing and controlling the circulating current of the cycloconverter in each phase in such a way that a circulating current in a phase with a large absolute value of the load current is small and a circulating current in a phase with a small absolute value of the load current is large, in order that the sum of lagged reactive powers in the phases of the cycloconverter and an advanced reactive power of the phase advancing capacitor cancel out each other.

DESCRIPTION OF THE PREFERRED EMBODIMENT

Figure 1:
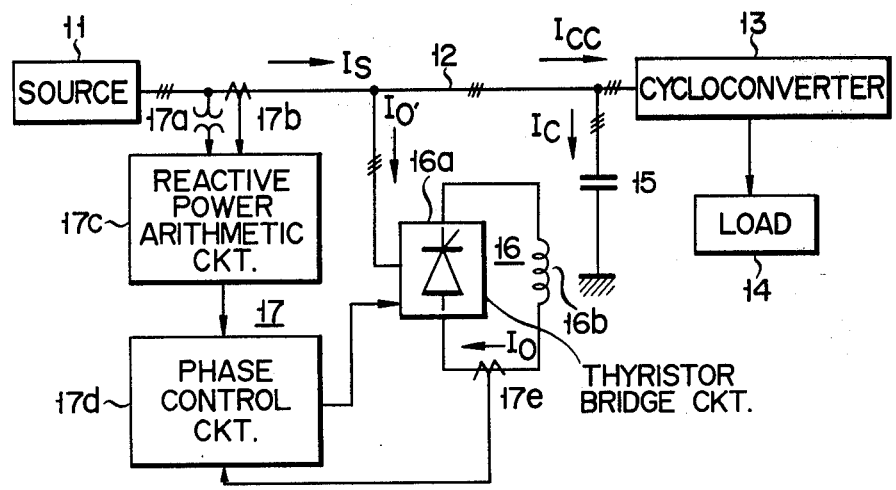
FIG. 1 shows a block diagram of an example of a control system for a prior art reactive power compensating type cycloconverter.
Figure 2:
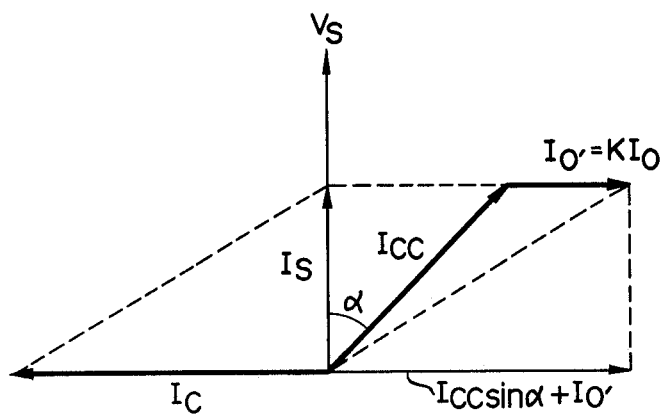
FIG. 2 is a vector diagram useful in explaining the operation of the system shown in FIG. 1.
Figure 3A:
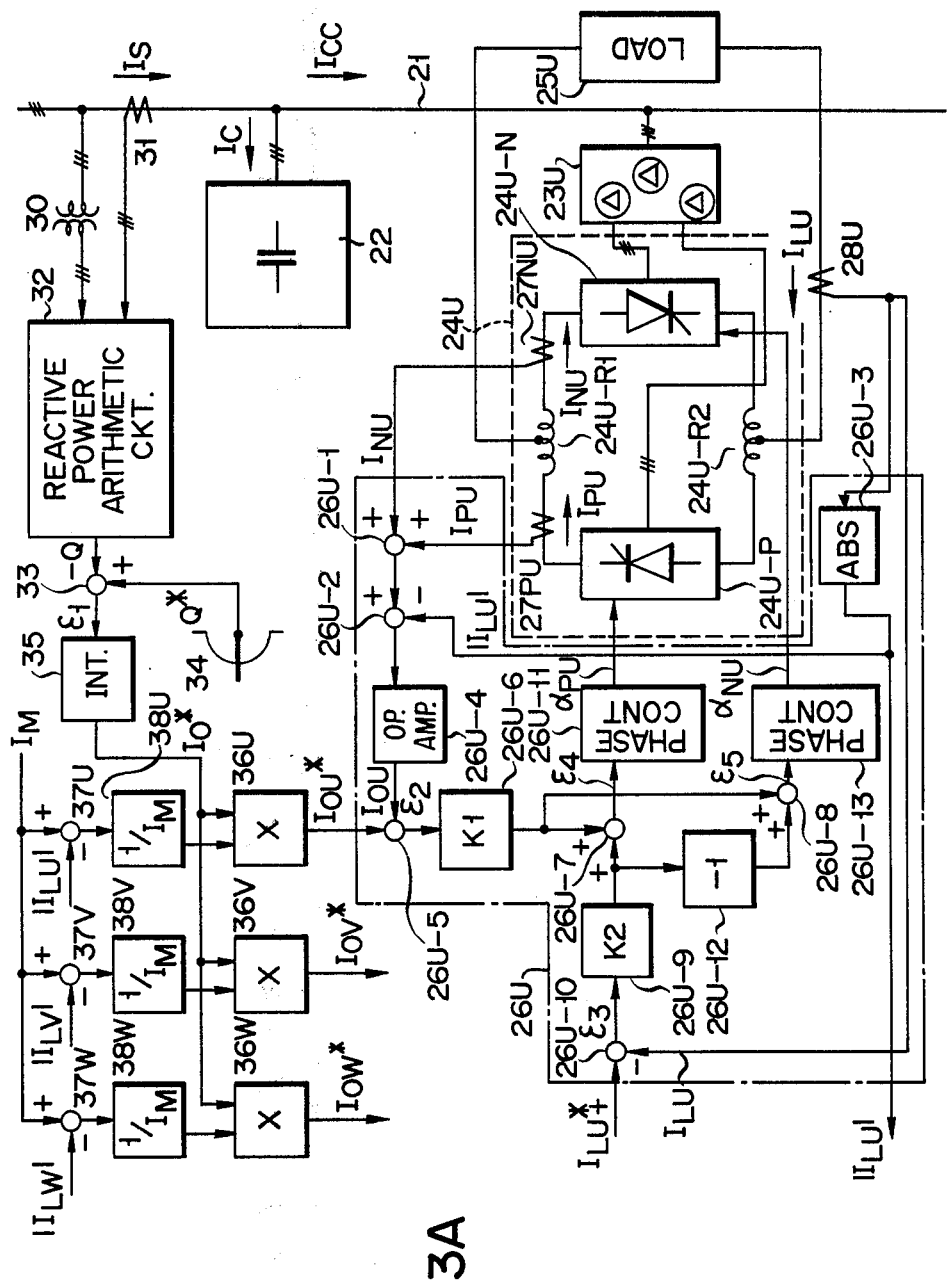
FIG. 3A and FIG. 3B shown in combination are block diagrams of an embodiment of a control system for a reactive power compensating type cycloconverter according to the present invention.
Figure 3B:
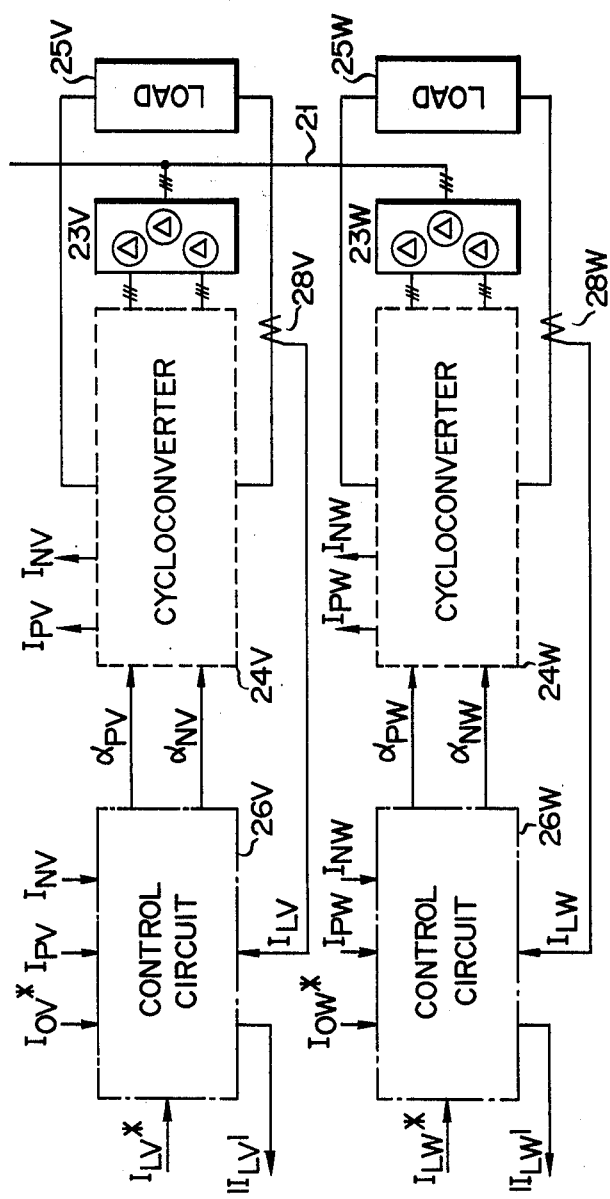

In FIGS. 3A and 3B, a phase advancing capacitor 22 delta- or star-connected is coupled with a three-phase AC bus 21 connected to a three-phase AC power source. Power source transformers 23U, 23V, 23W for U, V and W phases are connected to the three-phase AC bus 21. The secondary sides of the transformers 23U, 23V and 23W are respectively connected with the power source sides of cycloconverters 24U, 24V and 24W of the current circulating type. The cycloconverter 24U of the U phase is comprised of a positive cycloconverter group 24U-P, a negative cycloconverter group 24U-N, and DC reactors 24U-R1 and 24U-R2 with middle taps connected between the converter groups 24U-P and 24U-N as shown. An output current of the cycloconverter 24U is derived from either of the middle taps of the DC reactors 24U-R1 and 24U-R2 and passed through the U phase load 25U, thereby to be circulated through the closed circuit. Likewise, the V- and W-phase transformers 23V and 23W are respectively connected to cycloconverters 24V and 24W of the circulating current type with similar constructions to feed output currents to load 25V and 25W.

These cycloconverters 24U, 24V and 24W are controlled by control circuits 26U, 26V and 26W, respectively. A current $I_{PU}$ flowing into a DC reactor 24U-R1 from the positive converter group 24U-P of the cycloconverter 24U of the U phase, and a current $I_{NU}$ flowing from the reactor 24U-R1 to a negative converter group 24U-N are detected by transformers 27PU and 27NU and are supplied to a (+) terminal of an adder 26U-1 in the control circuit 26U. An output of the adder 26U-1 is applied to a (+) terminal of an adder 26U-2. An absolute value of a detected signal representative of a load current $I_{LU}$ detected by a transformer 28U is supplied from an absolute circuit 26U-3 to a (−) terminal of the adder 26U-2. An output signal from the adder 26U-2 is halved by an operational amplifier 26U-4 and is applied to one of the input terminals of a comparator 26U-5. An output signal of the operational amplifier 26U-4 is representative of a circulating current $I_{OU}$ and which is compared with a current command value $I_{OU}^*$ at a comparator 26U-5.

The current command value $I_{OU}^*$ is obtained in the following manner. The voltage and the current on the 3-phase AC line 21 are detected by the transformers 30 and 31, and the detected signals are applied to the reactive power arithmetic circuit 32, in which a reactive power Q of the power source is calculated. The calculated value is supplied to one input terminal of a comparator 33. The other input terminal of the comparator 33 receives a reactive power command value Q* obtained from a potential setter 34 such as a potentiometer, for example. Then, a deviation value $\epsilon_1$ between the two values is obtained. After a signal representative of the deviation value $\epsilon_1$ is integrated by an integrating element 35, an output signal $I_O^*$ is applied to one input terminal of a multiplier 36U. As the result from the integration of the deviation value $\epsilon_1$ signal by the integrating element 35, its constant deviation component is made zero.

The circulating current command value $I_O^*$ is distributed to the respective phases U, V and W by the multipliers 36U, 36V and 36W in the following way. A set current value $I_M$ from a potential setter (not shown) is applied to (+) terminals of adders 37U, 37V and 37W. The set current value $I_M$ is selected at a value somewhat larger than a maximum value Im of a load current. The respective (−) terminals of the adders 37U, 37V and 37W are respectively supplied with the absolute values of load currents $I_{LU}$, $I_{LV}$ and $I_{LW}$ of the phases from the transformers 28U, 28V and 28W, through the control circuits 26U, 26V and 26W. Then, difference signals of those absolute values from the set current value $I_M$ are obtained. The difference signals are made to $1/I_M$ by the succeeding amplifiers 38U, 38V and 38W, and are unitized by $1/I_M$. Output signals of the amplifiers 38U, 38V and 38W are applied to the other input terminals of the multipliers 36U, 36V and 36W where those signals are multiplied by circulating current command value $I_O^*$. Then circulating current command distributing values $I_{OU}^*$ $I_{OV}^*$ and $I_{OW}^*$ are obtained as the outputs respectively. The distributing operations of the circulating current command values are given by $$I_{OU}^* = I_O^* \cdot \frac{I_M - |I_{LU}|}{I_M} \quad (1)$$

$$I_{OV}^* = I_O^* \cdot \frac{I_M - |I_{LV}|}{I_M} \quad (2)$$

$$I_{OW}^* = I_O^* \cdot \frac{I_M - |I_{LW}|}{I_M} \quad (3)$$

A deviation $\epsilon_2$ between a signal indicating the circulating current command value $I_{OU}^*$ of the U phase thus obtained and a signal indicating the circulating current $I_{OU}$ is obtained in the comparator 26U-5. The deviation $\epsilon_2$ is amplified by the amplifier 26U-6 to be a predetermined value, and is supplied to one input terminal of each of the adders 26U-7 and 26U-8. The other input terminal of the adder 26U-7 receives an output signal from the amplifier 26U-9 which is supplied with a signal of a deviation $\epsilon_3$ between a load current command value $I_{LU}^*$ and a load current value $I_{LU}$ from the comparator 26U-10. Assuming that coefficients of the amplifiers 26U-6 and 26U-9 be K1 and K2, respectively, a signal input $\epsilon_4$ applied to the phase control circuit 26U-11 of a positive phase is given $$\epsilon_4 = K2 \cdot \epsilon_3 + K1 \cdot \epsilon_2 \quad (4)$$

The signal $\epsilon_4$ is given as a signal of a firing angle $\alpha_{PU}$ of thyristors forming the positive converter group 24U-P by way of the phase control circuit 26U-11.

Meanwhile, after inverted by the inverter 26U-12, an output signal of the amplifier 26U-9 is applied to the other (+) terminal of the adder 26U-8. Therefore, an output signal $\epsilon_5$ of the adder 26U-8 is given $$\epsilon_5 = -K2 \cdot \epsilon_3 + K1 \cdot \epsilon_2 \quad (5)$$

The signal $\epsilon_5$ is supplied to the phase control circuit 26U-13, and a firing angle of thyristors forming the negative converter group 24U-N is controlled by an output $\alpha_{NU}$ of the circuit 26U-13.

The remaining cycloconverters 24V and 24W of the V and W phases, respectively, are controlled by firing angle control signals $\alpha_{PV}$, $\alpha_{NV}$, $\alpha_{PW}$ and $\alpha_{NW}$ generated from the control circuits 26V and 26W with similar constructions.

The control operation of load current of the cycloconverter of the circulating current type is described by using that of the U phase.

The phase control circuits 26U-11 and 26U-13 are so controlled that the cycloconverter 24U produces a voltage proportional to the deviation $\alpha$ which is obtained by comparing a load current command value $I_{LU}^*$ with a detected value of the load current $I_{LU}$ actually flowing into the U phase load 25U by the comparator 26U-10. The deviation $\epsilon_5$ is inputted to the circuit 26U-13 via the inverter 26U-12 from the amplifier 26U-9 so that an output phase $\alpha_{PU}$ of the circuit 26U-11 is constantly related by $\alpha_{NU} = 180° - \alpha_{PU}$. Specifically, the normal operation is performed under a condition that an output voltage $V_{PU} = k_v \cdot V_S \cdot \cos \alpha_{PU}$ of the positive converter group 24U-P balances with an output voltage $V_{NU} = k_v \cdot V_S \cdot \cos \alpha_{NU} = -V_{PU}$ of the negative converter group 24U-N at a load terminal 25U. When the current command value $I_{LU}^*$ sinusoidally changes, the deviation $\epsilon_3$ also changes correspondingly. As a result, the output phases $\alpha_{PU}$ and $\alpha_{PN}$ are so controlled that a sine wave current $I_{LU}$ flows into the load 25U. In this normal operation mode, the voltage of the converter 24U-P balances with that of the converter 24U-N, so that the circulating current $I_{OU}$ little flows.

The load currents $I_{LV}$ and $I_{LW}$ of the V and W phases, respectively, are also controlled in a similar way.

The control operation of the circulating current will next be described. The U phase cycloconverter 24U will again be used as an example for the explanation here.

The circulating current $I_{OU}$ is detected in the following manner. That is, the detected value of the output current $I_{PU}$ of the positive converter group 24U-P is added to the output current $I_{NU}$ of the negative converter group 24U-N, in the adder 26U-1. An absolute value of the detected load current $I_{LU}$ from the absolute value circuit 26U-3 is subtracted from the sum of the adder 26U-1 by the adder 26U-2. Then, the difference is multiplied by $\frac{1}{2}$ at the multiplier 26U-3 thereby to have the circulating current $I_{ON}$. It is given $$I_{OU} = (I_P + I_N - |I_{LU}|)/2 \quad (6)$$

The circulating current $I_{OU}$ thus obtained is compared with the command value $I_{OU}^*$ in the comparator 26U-5. The obtained deviation $\epsilon_2 = I_{OU}^* - I_{OU}$ is applied to the adders 26U-7 and 26U-8 through the amplifier 26U-6, as described above.

Accordingly, the inputs $\epsilon_4$ and $\epsilon_5$ to the phase control circuits 26U-11 and 26U-13 are given as the equations (4) and (5), respectively.

Therefore, the relation of $\alpha_{NU} = 180° - \alpha_{PU}$ is lost, and the output voltage $V_{PU}$ of the positive group converter 24U-P unbalances with the output voltage $V_{NU}$ of the negative group converter 24U-N by a value proportional to $K1 \cdot \epsilon_2$. The difference voltage is applied to DC reactors 24U-R1 and 24U-R2, so that the circulating current $I_{OU}$ flows. When the circulating current $I_{OU}$ is exceeding the command value $I_{OU}^*$, the deviation value $\alpha_2$ decreases to make the difference voltage smaller. As a result, the circulating current $I_{OU}$ is controlled to be equal to the command value $I_{OU}^*$.

The circulating currents $I_{OU}$ and $I_{OW}$ of the cycloconverters of the V and W phases are similarly controlled according to the command values $I_{OU}^*$ and $I_{OW}^*$, respectively.

The reactive power control is performed as follows.

Current detectors 31 and voltage detectors 30 (for three phases, respectively) are provided at a receiving end, and the reactive power Q is obtained at the reactive power arithmetic circuit 32. The command value $Q^*$ of the reactive power is usually set at zero. And the deviation $\epsilon_1$ is produced by the comparator 33. The deviation $\epsilon_1$ is applied to the integrating element 35, and its output $I_O^*$ becomes the command values $I_{OU}^*$, $I_{OV}^*$, $I_{OW}^*$ of the circulating current through the multipliers 36U, 36V and 36W of the corresponding phases.

The lagged reactive current $I_{REACT}$ of the three-phase of the cycloconverter is given by $$I_{REACT} = K1\{I_{PU}\sin\alpha_{PU} + I_{NU}\sin\alpha_{NU} + \quad (7)$$
$$I_{PV}\sin\alpha_{PV} + I_{NV}\sin\alpha_{NV} + I_{PW}\sin\alpha_{PW} + I_{NW}\sin\alpha_{NW}\}$$

where $$\alpha_{NU} \approx 180° - \alpha_{PU}, \alpha_{NV} \approx 180° - \alpha_{PV},$$
$$\alpha_{NW} \approx 180° - \alpha_{PW}.$$

The equation (7) can be rewritten into $$I_{REACT} = K1\{(|I_{LU}| + 2I_{OU})\sin\alpha_{PU} + \quad (8)$$
$$(|I_{LV}| + 2I_{OV})\sin\alpha_{PV} + (|I_{LW}| + 2I_{OW})\sin\alpha_{PW}\}$$

The circulating currents $I_{OU}$, $I_{OV}$ and $I_{OW}$ are controlled so that the current $I_{REACT}$ is equal to the advanced reactive current $I_C$ of the phase advancing capacitor 22.

When the current $I_C$ is larger than the current $I_{REACT}$, the reactive power at the receiving end is advanced in the phase, and the reactive power Q takes a negative value. Accordingly, $\epsilon_1 = Q^* - (-Q)$ becomes positive to increase the current $I_O^*$ through the integrating circuit 35. As a result, the currents $I_{OU}^*$, $I_{OV}^*$ and $I_{OW}^*$ passed through also increase, so that the circulating currents $I_{OU}$, $I_{OV}$ and $I_{OW}$ of the cycloconverters of the respective phases also increase. Therefore, the lagged reactive power current $I_{REACT}$ increases to be equal to the current $I_C$. Conversely, when the current $I_{REACT}$ becomes larger than the current $I_C$, the reactive power Q is positive and $\epsilon_1 = Q^* - Q$ becomes negative. As a result, the current $I_O^*$ is reduced, so that the circulating currents $I_{OU}$, $I_{OV}$ and $I_{OW}$ of the cycloconverters of the respective phases decrease.

In this case, the command value $I_O^*$ of the circulating current can be used as the command values $I_{OU}^*$, $I_{OV}^*$ and $I_{OW}^*$ of the circulating currents of the respective phases, although the following disadvantage is involved.

Figure 4A:
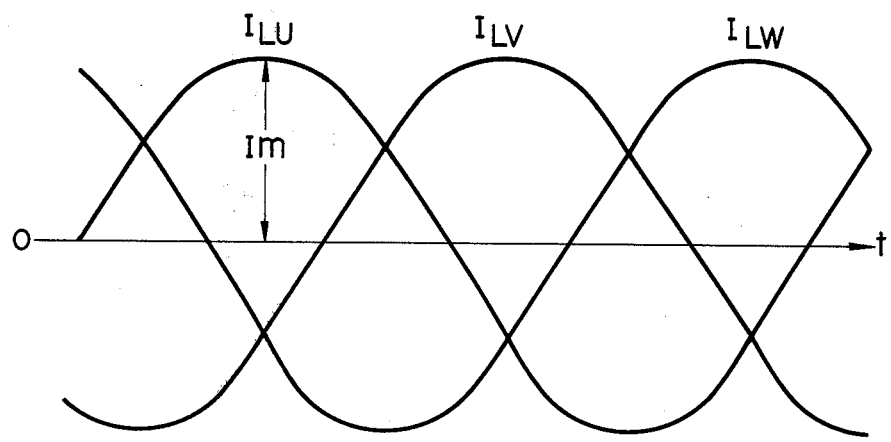
FIGS. 4A to 4C and FIGS. 5A to 5C are waveforms useful in explaining the operation of the control system shown in FIGS. 3A and 3B.
Figure 4B:
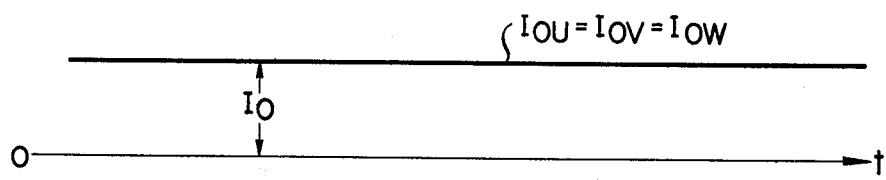
Figure 4C:
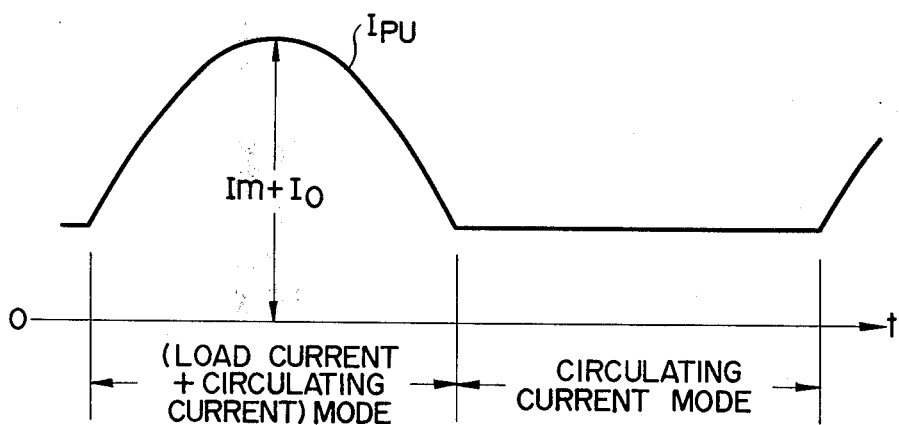

FIGS. 4A to 4C illustrate waveforms of the load currents for the respective phases when $I_{OU}^* = I_{OV}^* = I_{OW}^* = I_O^*$ (FIG. 4A), the circulating currents $I_{OU} = I_{OV} = I_{OW}$ (FIG. 4B) and the output current $I_{PU}$ (FIG. 4C) of the positive group converter in the U phase. If the three-phase load is not changed, the command value $I_O^*$ of the circulating current is substantially constant, and the circulating currents of the respective phases are constant. With respect to the output current $I_{PU}$ of the positive converter group 24U-P of the U phase, there are a mode period of (load current+circulating current) and a mode period of only the circulating current. A maximum current capacity of the converter is of course determined by a maximum value in the former mode. That is, by an amount of the circulating current $I_{OU}$, the current capacity must be increased. Particularly in the large capacitive apparatuses, the increase of the current capacity results in increase of the number of the thyristors. The increase of the number of the thyristors damages an economical efficiency of the power converting system and a reliability of the system as well.

The control system of the present invention as illustrated in FIGS. 3A and 3B successfully solves the above problem. In the control system, the command values $I_{OU}{}^*$, $I_{OV}{}^*$ and $I_{OW}{}^*$ of the circulating currents are distributed as follows:

$$I_{OU}{}^* = I_O{}^* \cdot \frac{I_M - |I_{LU}|}{I_M} \quad (9)$$

$$I_{OV}{}^* = I_O{}^* \cdot \frac{I_M - |I_{LV}|}{I_M} \quad (10)$$

$$I_{OW}{}^* = I_O{}^* \cdot \frac{I_M - |I_{LW}|}{I_M} \quad (11)$$

The adders 37U, 37V and 37W, the amplifiers 38U, 38V and 38W, and the multipliers 36U, 36V and 36W are used for executing the above operations.

Figure 5A:
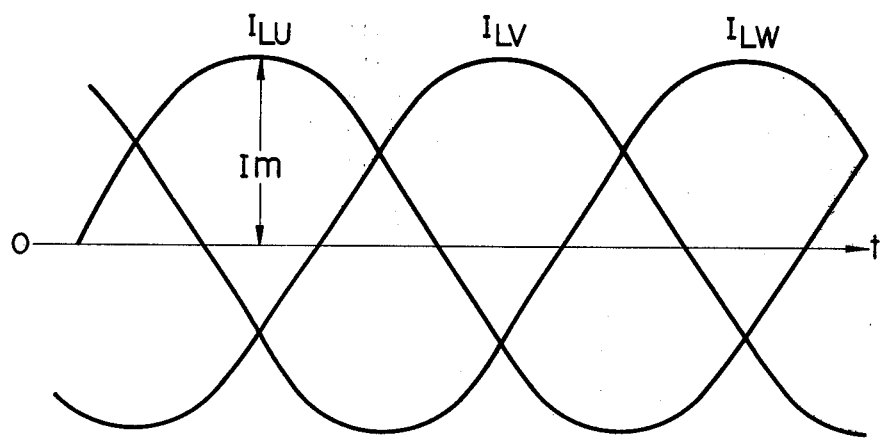
Figure 5B:
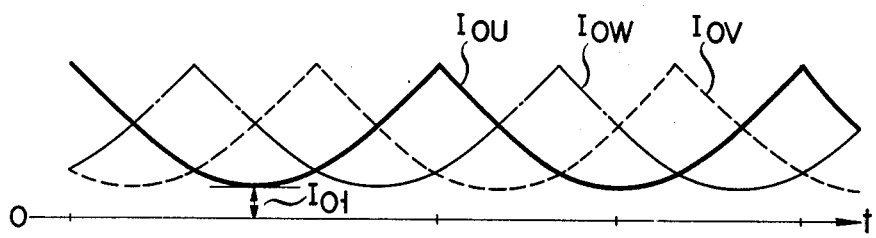
Figure 5C:
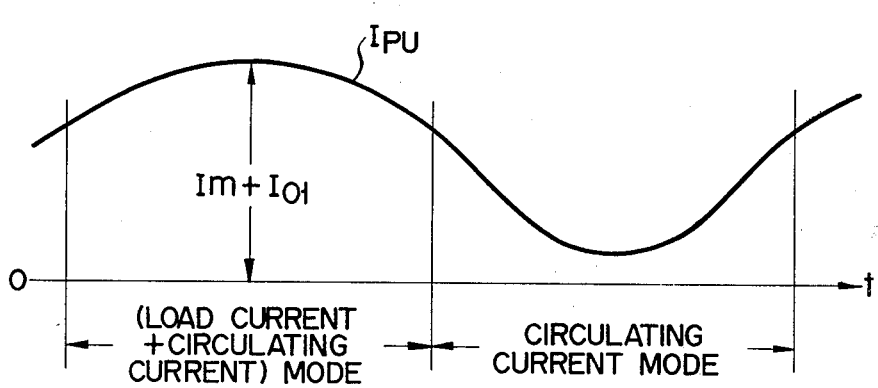

FIGS. 5A to 5C illustrate waveforms of the load currents $I_{LU}$, $I_{LV}$ and $I_{LW}$ (FIG. 5A) of the respective phases when the currents are distributed as mentioned above, the circulating currents $I_{OU}$, $I_{OV}$ and $I_{OW}$ (FIG. 5B), and the output current $I_{PU}$ (FIG. 5C) of the positive converter group of the U phase. As seen from the waveform diagrams, the output current $I_O{}^*$ of the integrating circuit 35 in the reactive power control circuit is substantially constant, while the command values $I_{OU}{}^*$, $I_{OV}{}^*$ and $I_{OW}{}^*$ of the circulating currents of the respective phases change in accordance with the absolute values of the load currents $I_{LU}$, $I_{LV}$ and $I_{LW}$, as mentioned above.

Considering only the U phase, when the absolute value of the load current $I_{LU}$ is small as shown in FIGS. 5A and 5B, the current $I_{OU}{}^*$ becomes large to increase the circulating current $I_{OU}$. When the absolute value of the load current $I_{LU}$ is large, the current $I_{OU}{}^*$ becomes small, so that a small amount of the circulating current $I_{OU}$ flows. In the V phase, a similar control to that of the U phase is performed with a phase shift of 120° with respect to the U phase. In the W phase, a similar operation is performed with a phase shift of further 120°.

As a whole, when the circulating current $I_{OU}$ of the phase U is large, the circulating currents $I_{OV}$ and $I_{OW}$ of the phases V and W are small. Conversely, when the current $I_{OU}$ is small, the currents $I_{OV}$ and $I_{OW}$ are large. In this way, the control system operates so as to obtain totally a necessary amount of reactive current.

Let us consider this fact from a view point of the output current $I_{PU}$ of the positive converter group 24U-P of the U phase, when the load current $I_{LU}$ is at the maximum value Im (FIG. 5A), the circulating current $I_{OU}$ takes a minimum value $I_{O1}$ (FIG. 5B). Accordingly, the maximum current capacity of the positive converter group is $Im + I_{O1}$, as shown in FIG. 5C. Therefore, it is possible to remarkably reduce the capacity of the cycloconverter by making a flow of the circulating current $I_{OU}$. The same thing is true for the remaining phases.

As seen from the foregoing description, the cycloconverter of the reactive power coompensating type of the invention can control the power factor of the fundamental wave as seen from the power source side to be always 1, without using a conventional special reactive power compensating device. The circulating currents of the cycloconverter in the respective phases are distributed in such a way that the circulating current is small when the absolute value of the load current is large, and it is large when the absolute value of the load current is small. Through this control, the current capacity of the converter can be considerably reduced.

While the cycloconverter for the three-phase has been described in the embodiment, it is evident that the present invention is applicable for any cycloconverter of the two or more phases, i.e., the polyphase type.

What is claimed is:

1. A control method for a reactive power compensating type cycloconverter wherein the lag reactive power of a connected AC power source system is controlled by controlling the circulating current of said cycloconverter which supplies a load current in each phase of a polyphase load and cancels the lead reactive power which is carried by a phase advancing capacitor connected to said AC power system, said reactive power compensating type cycloconverter controlling the reactive power of said AC power system, comprising the steps of:
   deriving a circulating current command value in response to the reactive power of said AC power system;
   compensating said circulating current command value in response to an absolute value of the load current of each phase;
   deriving a circulating current reference value for each phase of said circulating current type cycloconverter; and
   controlling the circulating current of said cycloconverter in response to said load current.

2. A control system for a reactive power compensating type cycloconverter wherein the lag reactive power of a connected AC power source system is controlled by controlling the circulating current of said cycloconverter which supplies a load current for each phase of a polyphase load and cancels the lead reactive power which is carried by a phase advancing capacitor connected to said AC power system, said reactive power compensating type cycloconverter controlling the reactive power of said AC power system, wherein said control system comprises;
   a reactive power calculating circuit which detects the reactive power of said AC power system;
   a control compensation circuit which outputs a circulating current command value of said circulating current type cycloconverter in response to an output signal of said calculating circuit;
   individual adders which output as feedback signals the deviation signals between the absolute values of each of the load currents of each phase and the desired set value; and
   a multiplier which multiples said circulating current command value and the output signals from said adders, and outputs a circulating current reference signal in each phase, wherein said reactive power compensating cycloconverter includes a lag reactive power control means which controls the circulating current in response to said circulatingg current reference signal.

* * * * *